Patented Jan. 22, 1935

1,988,464

UNITED STATES PATENT OFFICE 1,988,464

CHEMICAL LEAVENING AGENT

Alfred Schultz, New York, Jacob Freilich, Brooklyn, and Charles N. Frey, New York, N. Y., assignors to Standard Brands Incorporated, New York, N. Y., a corporation of Delaware No Drawing. Application April 3, 1931,
Serial No. 527,616

15 Claims. (Cl. 99—10)

This invention relates to chemically-leavened baked products, and more particularly to novel chemical leavening mixtures and methods of using the same.

A general object of the invention is to provide a chemical leavening mixture for baked products, composed of inexpensive and readily available materials, and having improved keeping qualities so that its leavening power does not decrease upon long standing before use.

A more particular object of the invention is to provide chemical leavening mixtures for baked goods, which give a uniform and readily controlled leavening action, and which impart desirable flavoring and color effects to the baked goods.

Other objects of the invention will in part be obvious and will in part appear hereinafter.

The invention accordingly comprises the several steps and relation and order of one or more of such steps with respect to each of the others, and the composition of matter possessing the features, properties and relation of constituents which are exemplified in the following detailed disclosure, and the scope of the application of which will be indicated in the claims.

The invention is characterized particularly by the use of a chemical leavening mixture comprising carbamide in conjunction with a urease containing substance, such as, for example, soy bean meal, St. John's bread or like legumes; the urease acting slowly and substantially completely to decompose the carbamide into ammonia ($NH_3$) and carbon dioxide ($CO_2$), during the formation of the dough and the baking operations; both of these gases are desirable leavening agents. The ammonia released during the course of the reaction has been found to give a delicate flavor to the baked goods and to increase the crust color thereof. The proportion of urease to carbamide used is dependent upon the rate of reaction desired, the general rule being that the more urease used, the shorter the period of time which is necessary for the desired leavening action.

In its preferred embodiment, the invention comprises the use of the carbamide and urease in conjunction with a relatively insoluble acid substance, such as, for example, mucic acid, sodium bitartrate or the like, the acid ingredient preferably being present in an amount sufficient to neutralize the excess of ammonia after baking, and to give a slightly acid reaction to the finished baked product.

We prefer to use an organic acid of low solubility like mucic acid, adipic, etc., rather than inorganic acid ingredients because these organic acids form ammonium salts which at baking temperature liberate ammonia and leave the acidifying ingredient (the acid) in the baked goods, thus giving the proper end acidity.

The amount of mucic acid or the like used is dependent upon the desired final pH of the baked product. If it is desired to make an alkaline biscuit with a dark brown color, the acid ingredient should be added only in traces, or in such amount that the final (i. e. after baking) pH is not less than 7.

The following example, indicating the amounts of materials and manner of use of the principles of the invention in baking, is given by way of illustration and not by way of limitation, since the amounts may be varied, as will be readily understood by one skilled in the art, within considerable limits:

*Example I*

A sponge is prepared by admixing the following:
  100 grams flour
  70 grams water
  1.5 grams carbamide
  2 to 3 grams urease, expressed as ground soy bean This sponge is allowed to stand for a period of from one to two hours, depending upon the amount of urease used; i. e., for 2 grams, about two hours; for 3 grams, about one hour.

The sponge is then admixed with the remaining dough ingredients, namely:
  100 grams flour
  25 grams water
  2 grams salt
  35 grams shortening
  3.5 grams mucic acid or the like After admixing, the dough is allowed to stand for about ten minutes and then baked.

The sponge method just described has been found to give exceptionally good results and may be considered as a preferred form of the process comprising the present invention. Nevertheless, if desired, the novel combination of ingredients comprising the present invention may be used in a non-sponge method of baking, it then being desirable to allow the dough to stand for a period of from twenty to thirty minutes prior to baking. A typical example of this is as follows:

*Example II*

200 grams flour
  2 grams salt
  35 grams shortening
  50 to 55 grams water
  2 grams soda
  2.5 grams mucic acid
  .28 gram carbamide
  .56 gram urease, expressed as ground soy bean In the last example it will be noted that the leavening is in part accomplished by soda and acid ingredients, as in the case of usual baking powder. In general with a non-sponge method of baking commercially leavened products, we have found this desirable, although it is to be understood that this invention is not limited to such a combination since, as has been previously pointed out, the principal ingredients may be used alone if desired.

It will thus be seen that by means of the present invention there has been provided novel, useful chemical mixtures and a process of using the same to produce improved baked products, and since certain changes may be made in the above composition of matter and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described and all statements of the scope of the invention which as a matter of language might be said to fall therebetween. Particularly it is to be understood that in said claims, ingredients or compounds recited in the singular are intended to include compatible mixtures of such ingredients wherever the sense permits.

Having described our invention, what we claim as new and desire to secure by Letters Patent is:

1. As a new composition of matter, a chemical leavening mixture for baked goods, consisting essentially of carbamide and a urease containing substance, the latter being present in sufficient amounts with respect to the former substantially completely to decompose it into ammonia and carbon dioxide during the formation and baking of the baked goods, and the amount of carbamide being sufficient to leaven the baked goods through such decomposition.

2. As a new composition of matter, a chemical leavening mixture for baked goods, consisting essentially of carbamide and a urease containing substance, the urease containing substance being present in an amount of from about 2 to 3 parts, expressed as ground soy bean, for each 1.5 parts of carbamide, said amount of carbamide being sufficient to leaven the baked goods through decomposition thereof by the urease.

3. As a new composition of matter, a chemical leavening agent for baked goods, comprising a mixture of carbamide, a urease containing substance, a relatively insoluble acid substance, and soda.

4. As a new composition of matter, a chemical leavening agent for baked goods, comprising a mixture of carbamide, a urease containing substance, a relatively insoluble organic acid, and soda.

5. As a new composition of matter, a chemical leavening agent for baked goods, comprising a mixture of carbamide, ground soy bean, mucic acid, and soda.

6. As a new composition of matter, a chemical leavening agent for baked goods, comprising the following ingredients in substantially the proportions given: soda 2 parts, mucic acid 2.5 parts, carbamide .28 parts, and urease, expressed as ground soy bean, .56 parts.

7. A process of manufacturing chemically-leavened baked goods, which comprises admixing with the flour, water, salt and shortening ingredients, a composition consisting essentially of a small amount of carbamide and an amount of a urease containing substance sufficient substantially completely to decompose the carbamide during the formation and baking of the baked goods; the amount of carbamide being sufficient to leaven the baked goods through such decomposition.

8. A process of manufacturing chemically-leavened baked goods, which comprises admixing with the flour, water, salt and shortening ingredients, a composition consisting essentially of a small amount of carbamide, an amount of a urease containing substance sufficient substantially completely to decompose the carbamide during the formation and baking of the baked goods, and a small amount of a relatively insoluble acid substance; the amount of carbamide being sufficient to leaven the baked goods through such decomposition, and the amount of relatively insoluble acid substance being sufficient to give a slightly acid reaction to the finished baked goods.

9. A process of manufacturing chemically-leavened baked goods which comprises admixing with the flour, water, salt and shortening ingredients a composition consisting essentially of a small amount of carbamide, an amount of a urease containing substance sufficient substantially completely to decompose the carbamide during the formation and baking of the baked goods, and a small amount of a relatively insoluble organic acid; the amount of carbamide being sufficient to leaven the baked goods through such decomposition, and the amount of relatively insoluble organic acid being sufficient to give a slightly acid reaction to the finished baked goods.

10. A process of manufacturing chemically-leavened baked goods, which comprises admixing with the flour, water, salt and shortening ingredients, a small amount of carbamide, an amount of a urease containing substance sufficient substantially completely to decompose the carbamide during the formation and baking of the baked goods, and a small amount of mucic acid; the amount of carbamide being sufficient to leaven the baked goods through such decomposition, and the amount of mucic acid being sufficient to give a slightly acid reaction to the finished baked goods.

11. A process of manufacturing chemically-leavened baked goods, which comprises admixing with the flour, water, salt and shortening ingredients, a leavening composition composed of the following ingredients in approximately the following proportions: soda 2 parts, mucic acid 2.5 parts, carbamide .28 parts, and urease, expressed as ground soy bean, .56 parts; allowing the dough to stand for a period of from 20 to 30 minutes, and baking.

12. A process of manufacturing chemically-leavened baked goods, which comprises admixing carbamide and a substance containing urease with a portion of the flour and water, allowing the sponge to stand for a period of about one to two hours, thereafter admixing the sponge with the remainder of the flour and water and with the other dough ingredients, including a relatively insoluble acid substance, allowing the dough to stand for a short time, and baking.

13. A process of manufacturing chemically-leavened baked goods, which comprises admixing carbamide and a substance containing urease with a portion of the flour and water, allowing the sponge to stand for a period of about one to two hours, thereafter admixing the sponge with the remainder of the flour and water and with the other dough ingredients, including a relatively insoluble organic acid, allowing the dough to stand for a short time, and baking.

14. A process of manufacturing chemically-leavened baked goods, which comprises admixing carbamide and a substance containing urease with a portion of the flour and water, allowing the sponge to stand for a period of about one to two hours, thereafter admixing the sponge with the remainder of the flour and water and with the other dough ingredients, including a relatively insoluble organic acid, allowing the dough to stand for a short time, and baking; the amounts of carbamide, urease containing substance and mucic acid being sufficient to leaven the baked goods by substantially complete decomposition of the carbamide during the mixing and baking steps and to give a slightly acid reaction to the baked goods.

15. A process of manufacturing chemically-leavened baked goods, which comprises preparing a sponge by admixing the following ingredients in substantially the following proportions: 100 grams of flour, 70 grams of water, 1.5 grams carbamide, 2 to 3 grams urease, expressed as ground soy bean, allowing the sponge to stand for a period of from one to two hours, mixing the sponge with the remaining dough ingredients comprising the following ingredients in substantially the following proportions: 100 grams of flour, 25 grams water, 2 grams salt, 35 grams of shortening, 3.5 grams of mucic acid, allowing the whole mass to stand for a period of about 10 minutes, and then baking.

ALFRED SCHULTZ.
JACOB FREILICH.
CHARLES N. FREY.